Patented Feb. 21, 1950

2,498,133

UNITED STATES PATENT OFFICE 2,498,133

TREATMENT OF POLYENE COMPOUNDS

Anderson W. Ralston, Chicago, Otto Turinsky, Palatine, and Leon Van Akkeren, Chicago, Ill., assignors to Armour and Company, Chicago, Ill., a corporation of Illinois No Drawing. Application July 14, 1943,
Serial No. 494,698

17 Claims. (Cl. 260—405.6)

This invention relates to processes for treating polyene fatty acids and their derivatives to improve the drying and resinifying qualities of such substances. More specifically the invention deals with processes of this nature in which certain iodine compounds are introduced for catalytic effects and the iodine element then removed to yield improved products.

It has been found that normally unconjugated polyene compounds, such as linseed oil or soya bean oil, for example, may be effectively treated to impart the properties of conjugated systems by heating these compounds in the presence of certain iodine substances. These iodine substances act as catalysts in producing an alteration which is very desirable for drying compositions. The iodine compounds which may be used include any amine hydroiodide which includes ammonium iodide, primary, secondary and tertiary amine hydroiodides such as octadecylamine hydroiodide, dodecylamine hydroiodide and tridodecylamine hydroiodide. Further iodides which may be used include aromatic amine hydroiodides such as aniline hydroiodide, dimethylaniline hydroiodide and naphthylamine hydroiodide, also any alphatic organic iodide such as propyl iodide, isopropyl iodide, hexyl iodide, octyl iodide, decyl iodide, dodecyl iodide, hexadecyl iodide, octadecyl iodide, 2-ethyl hexyl iodide, $\alpha$-iodostearic acid and esters thereof, iodoform, indene iodide, hexadecenyl iodide, octadecenyl iodide, also any inorganic iodide of elements of the third, fourth and fifth groups of the periodic table of elements, such as iodides of phosphorus, tin, aluminum, antimony and arsenic, also iodine itself.

In general, we can use any iodine compound which is capable of combining with a hydrogen element in the polyene compound to form hydrogen iodide. Hydrogen iodide itself is obviously unsuitable and iodo-benzene, which is a very heat-stable substance, is an example of an iodine compound outside the class of those which can be used. All those iodine compounds including iodine itself which will react with hydrogen at elevated temperatures not exceeding about 350° C. to form hydrogen iodide will, for convenience be called "hydrogen reactable iodine compounds."

Although the products heretofore produced through the effect of the special iodine catalyst materials have been shown by the recognized tests to have a refractive index and diene value corresponding to a high degree of conjugation, they have not had gelling properties which were to be desired, and have not passed the gelling tests as would be required by very high quality conjugated drying materials.

We have now discovered that these products may be further improved, particularly as to their gelling properties, by removing the iodine element of the catalyst compounds from the polyene materials, preferably by interrupting the conversion process to remove the iodine before the maximum conjugative effect as indicated by the refractive index has been attained. These iodine compounds were contained in the product only in extremely small proportions, and prior to our discovery there was no indication that they were in any way contributing to an undesirable influence.

We have found that by further treating the conjugated polyenes with lead, copper, or silver compounds it is possible to convert the iodine element contained in the conjugated polyenes to form a non-volatile oil-insoluble iodide which can be readily separated from the polyenes. Examples of the lead compounds which may be used are lead oxide, lead acetate, lead soaps of fatty acids, lead naphthenate, lead formate and lead oxalate. Among the silver compounds which may be used are silver acetate, silver sulfate, silver oxide and silver soaps of fatty acids. Examples of the copper compounds which can be used are copper acetate, copper oxide, copper soaps of fatty acids and copper sulfate.

Our improved processes can be used in connection with a variety of starting materials. In general, we can treat any polyene compound which contains double bonds in unconjugated relation and improve its drying and resinifying properties. These processes are of special importance in connection with the natural polyene compounds such as natural oils, for example linseed oil, fish oils, soya bean oil, corn oil and cottonseed oil which have substantial proportions of unsaturated acid radicals of the unconjugated type, but other fatty acid materials which have some unsaturated acid radicals such as dehydrated castor oil may also be treated to advantage.

For convenience we will use the terms "fatty polyene compounds," and "fatty oil" to designate the organic polyenes derived from vegetable and marine sources as distinguished from the mineral or petroleum sources, and these terms may be so understood where they appear in the specification and claims.

The treatment may be performed directly on the fatty acids or on the derivatives of the fatty acids. A preferred practice is to use the natural oils or glycerides. If desired, the natural oils may first be hydrolyzed and the natural acid mixtures so obtained treated in accordance with the improved practices. In the case of natural oils, a preferred procedure is to first hydrolyze the oil and so obtain a natural fatty acid mixture, and then subject this mixture to fractional distillation or fractional crystallization to obtain a fraction in which the polyene radicals are contained in a concentration greater than in the original mixture, and then subject the fraction so obtained to heat treatment with one of the iodine compounds heretofore referred to as a catalyst, and follow this by removal of the iodine element through treatment by one of the lead, silver, or copper compounds above mentioned.

In carrying out the conversion step, the unconjugated natural oil or other polyene compound may be heated to a temperature of about 140 to 160° C. and the iodine compound added thereto. The iodine compound need only be in very small amounts, of the order of five parts per one thousand parts of the polyene material. The mass may be agitated, preferably rapidly at first and then more slowly, the temperature being maintained until there is substantial conversion to the conjugated form. About two and one-half hours is usually sufficient. During the first part of the period the rate of rise in the refractive index is quite great and toward the latter part of the period this rate may drop off to about 0.0002 in ten minutes. After the rate of conversion to the conjugated form, as indicated by the rise in refractive index, has dropped to something of the order of that just mentioned, the catalytic process may advantageously be interrupted by introducing one of the lead, copper, or silver compounds before referred to, such as lead carbonate.

If the conversion step is permitted to proceed to its conclusion through the action of the special catalyst, effects are obtained which are not usually desirable, and we therefore prefer to interrupt the action by removal of the iodine element. One of the effects accompanying completion of the catalytic conversion is polymerization and an increase in viscosity. By introducing the lead, copper, or silver compounds to render the iodine element insoluble, a positive control can be effected which halts the alteration and prevents unwanted characteristics. Though desirable, it is not essential that in our process the lead, copper or silver compounds be introduced and the insoluble iodine compound removed prior to the completion of the catalytic action.

Though the temperature maintained is a factor which goes to determine the rate at which conjugation takes place in the conversion step, the catalytic effects are also present at lower temperatures and control of the process through temperature alone cannot compare with that which is possible through the use of the lead, copper or silver compounds for the removal of the iodine element of the catalyst. So far as temperature is concerned, it is desirable to maintain about 140 to 160° C. during the conversion step, but greater or lesser temperatures may be used. The temperatures should not be so high as to produce any substantial decomposition of the polyene material, and though temperatures as low as 125° C. may be used, the lower temperatures require substantially longer times for the conversion to take place. Suitably a solvent may be used to promote dispersion of the iodine catalyst compound in the polyene material, and for this purpose any solvent for iodine, such as benzene, acetic anhydride, etc., may be used.

Only small amounts of the lead, copper, or silver compounds are necessary to produce the desired effect in reaction on the iodine catalyst material. It is desirable to use at least the amounts which are theoretically necessary for chemical reaction with the added iodine substance. For example, where .6% of iodine based on the amount of the polyene compound, is used for the catalysis, .6% of basic lead carbonate also based on the amount of the polyene compound, has been found satisfactory.

We have further discovered that when linseed oil materials are used it is especially advantageous to treat the oil with acetic anhydride. The treatment with acetic anhydride has the effect in this process of greatly reducing the required amounts of the iodine compound for producing the desired conjugation effect in the linseed oil materials. This also results in a reduction in the necessary amounts of the lead, silver, or copper compounds for effecting removal of the iodine.

In the acetic anhydride treatment we prefer to add at least a part of the acetic anhydride to the linseed oil, then heat the oil to a temperature above 75° C., suitably about 130° C. and then admix the iodine compound. Advantageously the iodine compound can be added in a solution of acetic anhydride. Improved results can be obtained if the acetic anhydride is added in any convenient manner so that it will be present when the iodine catalytic effect is utilized, but preferably it is added prior to heating the oil and also at least a part of it is preferably added before the introduction of the iodine compound.

The amount of acetic anhydride employed is not critical, it being necessary only that some acetic anhydride be present. Where the treatment of the oil is conducted in an open container, a larger quantity should be added, but where a closed container is used, smaller quantities are sufficient. Usually we use from 10 to 100 parts of acetic anhydride to 1000 parts of linseed oil. We find that when linseed oil is treated the use of the acetic anhydride enables a substantial reduction in the amount of the iodine compound used. For example, where normally 1.2 to 1.5% of iodine, based on the amount of the oil, is used it is possible to obtain substantially the same conjugative effect with only .5 or .6% of the iodine compound when the acetic anhydride is employed.

Upon addition of the lead carbonate or other of the removal compounds herein referred to, the temperature of the mixture may advantageously be raised to promote the reaction in forming the insoluble iodine substances. For example, when the conversion has been effected at about 140 to 160° C. the temperature may be raised to something like 230 to 260° C. and this operates to facilitate the reaction forming the insoluble iodine substance. After this reaction the mixture may be cooled and then filtered to remove the resulting iodine compound. Other means of removal as by settling or centrifuging may also be used to effect the separation.

Specific examples of our improved processes are given as follows:

*Example 1*

Acid-refined linseed oil is used having the following constants:

Refractive index, $n_{20}=1.4808$
Iodine value, 181.0
Diene value, 1.5 to 2.0

The drying time of this material without addition of drying ingredients is 70 to 85 hours, and it fails to gel where heated to 300° C. for several hours. 1,000 parts of this linseed oil is heated to a temperature of 130° C. with 10 parts of acetic anhydride, and this is poured into a hot solution formed by 5 parts of iodine in 50 parts of acetic anhydride. The resulting oil mixture is thoroughly agitated and then heated with gentle stirring, the temperature being maintained at about 150° C. After about two hours and 45 minutes the rise in refractive index drops off to a rate of 0.0002 in 18 minutes. At this time the catalytic process is interrupted by the addition of 6 parts of basic lead carbonate with vigorous and continual stirring while the heat is increased to about 260° C. within a period of about 35 minutes. The mixture is then cooled and filtered by means of suction through paper covered with a layer of filter aid. The filtration is rapid, even at room temperature, and the filtrate is a clear brownish yellow oil.

The constants of the processed oil are as follows:

Refractive index, $n_{20}=1.4883$
Iodine value, 134.0
Diene value, 18.3

Without the addition of drying ingredients the processed oil dries in 16 to 19 hours, and at 300° C. gels in three hours. The treated oil dries rapidly when coated upon a glass surface and gives a frosted film characteristic of the conjugated drying oils.

*Example 2*

Alkali-refined linseed oil is used as the material treated. Some of the constants of this oil before treatment are as follows:

Refractive index, $n_{20}=1.4803$
Iodine value, 180.7
Diene value, 1.5 to 2.0
Drying time (without driers), 70 to 85 hours
Gelation time (at 300° C.), fails to gel This alkali-refined linseed oil is treated by the same procedure as outlined in Example 1 except the temperature is maintained at about 160° C. for two and one-half hours. A product is obtained which is somewhat lighter in color than that obtained in Example 1.

Some of the constants of the processed oil are as follows:

Refractive index, $n_{20}=1.4874$
Iodine value, 145.0
Diene value, 17.8
Drying time (without driers), 14 to 18 hours
Gelation time (at 300° C.), 2 hours 50 minutes

*Example 3*

Raw linseed oil is used as the material treated, having the following constants:

Refractive index, $n_{20}=1.4792$
Iodine value, 174.0
Diene value, 1.0
Drying time (without driers), about 90 hours
Gelation time (at 300° C.), fails to gel 1000 parts of this material are heated to a temperature of about 130° C. with 10 parts of acetic anhydride and this is poured into a hot iodine solution prepared from 5 parts of iodine dissolved in 50 parts of acetic anhydride. The resulting oil mixture is heated with gentle stirring. The temperature is maintained at about 150° C., and after about one and one-quarter hours the rise in refractive index drops off to a rate of 0.0005 in 15 minutes. At this time basic lead carbonate (6 parts) is added with vigorous stirring. The heat is increased to raise the temperature to about 260° C. while the agitation is sufficiently vigorous to prevent settling of any solid. The mixture is then cooled and filtered as in Example 1 and the filtrate is a reddish brown, clear, unbodied oil.

Some of the constants of the processed oil are:

Refractive index, $n_{20}=1.4870$
Iodine value, 125.0
Diene value, 16.7
Drying time (without driers), 15 to 18 hours
Gelation time (at 300° C.), 4 hrs. 15 min.

*Example 4*

Raw linseed oil is the material used. Some of the constants are:

Refractive index, $n_{20}=1.4808$
Iodine value, 177.0
Diene value, 1.9
Drying time (without driers), about 90 hours
Gelation time (at 280° C.), fails to gel 500 parts of this material is heated for one hour at 200° C. with 20 parts of acetic anhydride, 5 parts of fuller's earth and 5 parts of decolorizing carbon. The mixture is agitated while being heated. After this treatment the mixture is cooled to room temperature and filtered by means of suction through paper covered with a layer of filter aid. The filtrate is light in color (orange-yellow), being much lighter than the original raw oil in color. The refractive index is substantially the same as that for the untreated oil. There is then added a warm solution of 5 parts iodine in 50 parts benzene, and the resulting mixture is heated with gentle stirring, a temperature of about 145° C. being maintained during a substantial rise in the refractive index. After heating for about one hour and 45 minutes the rise in refractive index drops off to about 0.0005 in 15 minutes as compared to the rate of 0.0028 for a previous 12-minute period. At the end of two hours of heating, during which time the temperature of about 145° C. is maintained, the catalytic process is interrupted by the addition of 5 parts of basic lead carbonate and the vigorous stirring continued while heat is increased to bring the temperature up to about 260° C. within 40 to 50 minutes. The mixture is then cooled to about 70° C. and filtered by means of suction through paper covered with a layer of filter aid.

The resulting treated oil has the following constants:

Refractive index, $n_{20}=1.4944$
Iodine value, 128.0
Diene value, 27.8
Drying time (without driers), 12 to 14 hrs.
The film being greatly "frosted"
Gelation time (at 280° C.), 58 minutes

Example 5

Acid refined linseed oil is used, and the oil has the following constants:

Refractive index, $n_{20}=1.4808$
Iodine value, 181.0
Diene value, 1.5
Drying time (without driers), 70 to 85 hours
Gelation time (at 300° C.), fails to gel.

1100 parts of this material is heated for one hour at 150° C. with 45 parts of acetic anhydride. The oil is cooled to about 50 to 60° C. and a solution of 5.5 parts iodine in 75 parts benzene is added. The resulting mixture is heated with gentle stirring and the temperature maintained at 145 to 147° C. during the substantial rise in the refractive index. At the end of one hour and 35 minutes 5.5 parts of basic lead carbonate is added with vigorous stirring, the heat being increased to bring the temperature up to about 225° C. The mixture is cooled to 40° C. and filtered by means of suction through paper covered with a layer of filter aid to remove the greater portion of the iodine element at a relatively low temperature. To remove the remainder of the iodine element the filtered oil, which now possesses a very light color, is heated to 260° C. with vigorous stirring after the addition of one part of basic lead carbonate and a few cc. of acetic anhydride. The temperature is held at 260° C. for ten minutes and the mixture is cooled to 40° C. and filtered as above. The oil thus obtained is unbodied and has a light amber color.

Some constants of the processed oil are:

Refractive index, $n_{20}=1.4874$
Iodine value, 133.2
Diene value, 16.3
Drying time (without driers), 17 to 20 hrs.
Gelation time (at 300° C.), 3 hours

Example 6

Extracted soya bean oil is used as the material to be treated. Some of the constants of this oil are:

Refractive index, $n_{20}=1.4746$
Iodine value, 130.0
Diene value, 0.9
Drying time (without driers), still tacky at 200 hrs.

1000 parts of this material is heated to a temperature of 70° C. and this is poured into a hot solution formed by 5 parts of iodine in 50 parts of benzene. The resulting oil mixture is thoroughly agitated and then heated with gentle stirring to 155 to 160° C., this temperature being maintained during the substantial rise in the refractive index. After heating for one hour the rate of rise in refractive index becomes slow, and the catalytic process is interrupted by the addition of six parts of basic lead carbonate with vigorous and continued stirring while the heat is increased to bring the temperature up to 260° C. within 30 to 40 minutes. The mixture is then cooled and filtered and the resulting product is unbodied and only very slightly darker than the original oil.

Some of the constants of the processed oil are:

Refractive index, $n_{20}=1.4822$
Iodine value, 99.5
Diene value, 22.5
Drying time (without driers), tacky at 18 hours, slightly drier at 70 hours

Example 7

The material is acid-refined linseed oil having the following constants:

Refractive index, $n_{20}=1.4808$
Iodine value, 181.0
Diene value, 1.5 to 2.0
Drying time (without driers), 70 to 85 hrs.
Gelation time (at 300° C.), fails to gel 100 parts of this material is heated for one hour at 160° C. with 4 parts of acetic anhydride. After cooling, a small portion of the oil (2½ parts) is ground with 0.4 part of iodine. The iodine thus ground is added to the main body of the oil, and the mixture heated with gentle stirring to a temperature of 140 to 150° C., this temperature being maintained during the rapid rise in the refractive index. At the end of 45 minutes, which includes 32 minutes during which the temperature is above 140° C., 0.5 part of basic lead carbonate is added with vigorous and continued stirring while the heat is increased to bring the temperature up to 260° C. After holding the temperature at 260° C. for about 10 minutes, the mixture is cooled to room temperature and filtered to yield a product which is unbodied and light-colored (orange-yellow).

Some of the constants of the improved oil are as follows:

Refractive index, $n_{20}=1.4870$
Iodine value, 135.0
Diene value, 16.0
Drying time (without driers), about 18 hrs.

Example 8

Soya bean oil is hydrolyzed to obtain a natural mixture of soya bean oil fatty acids, and this mixture is fractionally distilled to obtain a high boiling fraction which contains about 60% linoleic acid, about 39% oleic acid and a small amount of saturated acids. This fraction has the following constants:

Refractive index, $n_{20}=1.4669$
Iodine value, 140
Diene value, 2.0

330 parts of this material is heated with .2 part of red phosphorus to a temperature of 250 to 300° C. with stirring. Then 0.26 part of iodine is added and the temperature is kept at 250 to 300° C. for about 20 minutes, or so long as there is a substantial increase in the refractive index. At the end of this time 0.3 part of basic lead carbonate is added with vigorous stirring, the temperature being held at 260° C. for 5 to 10 minutes. When the mixture is cooled and filtered it is found to have:

Refractive index, $n_{20}=1.4732$
Diene value, 34.5; and
Iodine value, 109

Example 9

100 parts of a fatty acid material obtained by hydrolysis and fractional distillation, and having constants the same as in Example 8, are heated with 0.5 part of dodecylamine hydroiodide with stirring, in an atmosphere of nitrogen. The temperature is maintained at 250 to 300° C. for about 20 minutes or as long as there is a substantial rise in the refractive index. At this time 0.2 part of basic lead carbonate is added with vigorous stirring, the temperature being maintained at 260° C. for 5 to 10 minutes. When cooled to room temperature and filtered, the resulting product is found to have a Refractive index, $n_{20}=1.4730$
Diene value, 33.0; and
Iodine value, 108

Example 10

100 parts of a fatty acid material obtained as in Example 8 and having the same constants, are heated with 0.3 part of octadecyl iodide, with stirring, in an atmosphere of nitrogen, the temperature being maintained at 250 to 310° C. for 13 minutes. 0.12 part of basic lead carbonate is added with vigorous stirring and a temperature maintained at 260° C. for 5 to 10 minutes. The mixture is cooled and filtered as in previous examples, the resulting product having a Refractive index, $n_{20}=1.4731$
Diene value, 29.2; and
Iodine value, 119

Example 11

Extracted soya bean oil is used as the material to be treated. It has the following constants:

Refractive index, $n_{20}=1.4750$
Diene value, 1.4
Iodine value, 134.4

328 parts of this material is heated with two parts of iodoform with stirring, the temperature being maintained at 160° C. to 180° C. for one hour and 10 minutes. At this time the Refractive index is $n_{20}=1.4804$
Iodine value, 115; and
Diene value, 21.8

One more part of iodoform is added and the mixture heated as before, the temperature being maintained at 160 to 180° C. for 25 minutes, at which time 3 parts of basic lead carbonate is added with vigorous stirring, the stirring being continued during heating to bring the temperature to 260° C. The mixture is then cooled to room temperature and filtered to produce a product having Refractive index, $n_{20}=1.4832$
Iodine value, 99.4
Diene value, 32.0

Example 12

100 parts of the same soya bean oil as used in Example 11 are heated with one part of iodo indene with stirring. The temperature is maintained at 150° C. to 180° C. for 14 minutes. The refractive index rises very rapidly during this time to 1.4840 and then remains practically unchanged. 0.6 part of basic lead carbonate is added and the mixture heated, the procedure being the same as the corresponding procedure in Example 11. The resulting oil has these constants:

Refractive index, $n_{20}=1.4835$
Iodine value, 105.1
Diene value, 27.0

Example 13

The material to be treated is a fatty acid fraction obtained by hydrolysis of cottonseed oil followed by fractional distillation. This fraction has the following constants:

Refractive index, $n_{20}=1.4662$
Iodine value, 135.0
Diene value, 2.0

150 parts of this material is heated for 18 minutes at 250 to 260° C. while nitrogen gas is bubbled through. Then 0.3 part of phosphorous iodide are added with stirring and the temperature maintained at 250 to 260° C. for 15 minutes. During this time the refractive index rises rapidly to a relatively steady value, and further catalytic action is interrupted by the addition of 0.3 part of basic lead carbonate with vigorous stirring, the temperature being maintained at 260° C. for 5 minutes. The mixture is then cooled to room temperature and filtered to yield a product having a Refractive index, $n_{20}=1.4720$
Diene value, 32.6
Iodine value, 106.0

Example 14

Raw linseed oil is the material to be treated having a

Refractive index, $n_{20}=1.4810$
Iodine value, 178
Diene value, 1.7
Drying time (without driers), about 90 hrs.
Gelation time (at 300° C.), fails to gel A catalyst is prepared by refluxing a mixture of 16 parts of iodine and 16 parts of aluminum turnings in 85 parts of carbon disulfide until the solution is a clear brown color.

This catalyst mixture is added to 1400 parts of raw linseed oil above mentioned and heat is applied with stirring, the temperature being maintained at 150 to 160° C. for one hour, (or until the rate of rise of refractive index becomes small). At this time the catalytic process is interrupted by the addition of 14.8 parts of lead oxide with vigorous and continuous stirring, the heat being increased to raise the temperature to 260° C. When cooled and filtered the oil is unbodied and clear brownish in color. Some of the constants of the processed oil are as follows:

Refractive index, $n_{20}=1.4920$
Iodine value, 144.5
Diene value, 27.0
Drying time (without driers), about 15 hrs.
Gelation time (at 300° C.), 2 hrs. 30 min.

Example 15

238 parts of an alkali-refined linseed oil is heated for 20 minutes to 170° C. under a vacuum to remove dissolved gases. The oil is then cooled to 150° C. and 48 parts of acetic anhydride added. This mixture is held at 150° C. for 10 to 15 minutes and then 1.2 parts of iodine added, the heating being continued until the refractive index ceases to rise substantially, which requires about two hours and 40 minutes. The refractive index rises from 1.4800 for the original oil to 1.4918. When subjected to the Brown heat test it turns dark and fails to gel after 7 hours of heating at 300° C.

Another portion of this same linseed oil material was treated after the substantial rise in the refractive index with silver acetate to remove the iodine element. Resulting silver iodide was filtered from the oil and the product gave a clear light colored gel in the Brown heat test after 5 hours heating at 295° C.

Example 16

125 parts of the same linseed oil used in Example 15 is heated for one-half hour at 150 to 160° C. while carbon dioxide gas is bubbled through it. The oil is then cooled to 70 to 80°

C., a slow stream of carbon dioxide gas is passed over the surface to supply an inert atmosphere and 1.25 parts of powdered iodine is added with vigorous stirring. The temperature is raised to 150° C. and the heating is continued until the refractive index ceases to rise substantially which requires about one hour. The refractive index, $n_{20}$ rises from 1.4800 for the original oil to 1.4925. The catalytic process is interrupted by the addition of 2.2 parts of powdered copper acetate monohydrate with vigorous stirring and the heat is increased to raise the temperature to 260° C. The theoretical quantity of copper acetate monohydrate required for the formation of cuprous iodide is 1.97 parts. When cooled the filtered oil is only slightly bodied and clear reddish brown in color. This product gives a gel in the Brown heat test after 2 hours and 20 minutes at 290° C. The oil does not darken during the test. A small portion of the oil is subjected to the Brown heat test prior to the treatment with the copper compound but it fails to gel and becomes very dark. The copper treated oil dries to a tacky film in 10 to 13 hours.

We claim:

1. A process for treating a fatty polyene compound containing double bands in unconjugated relation comprising subjecting said compound to contact at elevated temperature with a hydrogen reactable iodine compound as a catalyst whereby to effect an increase in the refractive index of said compound, and thereafter removing said iodine element from said polyene compound.

2. A process for treating a fatty polyene compound containing double bonds in unconjugated relation comprising subjecting said compound to contact at elevated temperature with a hydrogen reactable iodine compound as a catalyst whereby to effect an increase in the refractive index of said compound, and thereafter adding to said polyene compound and catalyst lead carbonate to form an iodine substance insoluble in said polyene compound, and removing said iodine substance from said polyene compound.

3. A process for treating soya bean oil comprising subjecting said oil to contact at elevated temperatures with a hydrogen reactable iodine compound as a catalyst to effect an increase in the refractive index of said oil, and thereafter removing the iodine element from said oil.

4. A process for treating linseed oil comprising subjecting said oil to contact at elevated temperature with a hydrogen reactable iodine compound as a catalyst to effect an increase in the refractive index of said oil, and thereafter removing the iodine element from said oil.

5. A process for treating a polyene material derived by hydrolysis and fractionation from a natural fatty oil but having a greater concentration of polyene acid radicals than is contained in said natural oil, comprising subjecting said material to contact at elevated temperatures with a hydrogen reactable iodine compound as a catalyst to effect an increase in the refractive index of said material, and thereafter removing the iodine element from said materials.

6. A process for treating linseed oil comprising admixing acetic anhydride with said oil, subjecting said oil containing said acetic anhydride to contact at elevated temperature with a hydrogen reactable iodine compound as a catalyst to effect an increase in the refractive index of said oil, and thereafter removing the iodine element from said oil.

7. A process for treating linseed oil comprising admixing acetic anhydride with said oil, heating said oil including said acetic anhydride to a temperature of at least 75° C., adding to said heated oil a hydrogen reactable iodine compound as a catalyst, maintaining the temperature of said oil above 100° C. until a substantial increase in the refractive index of said oil has taken place, and thereafter removing the iodine element from said oil.

8. In a process for treating linseed oil, the step of subjecting said oil to contact at elevated temperature with a hydrogen reactable iodine compound as a catalyst in the presence of acetic anhydride to effect an increase in the refractive index of said oil.

9. A process for treating a fatty polyene compound containing double bonds in unconjugated relation, comprising subjecting said compound to contact at elevated temperature with an iodine compound which is capable of combining with hydrogen and which serves as a catalyst, whereby to effect an increase in the refractive index of said polyene compound, thereafter adding to said polyene compound and catalyst an oil soluble lead compound whereby to form an iodine substance insoluble in said polyene compound, and removing said iodine substance from said polyene compound.

10. A process for treating a fatty polyene compound containing double bonds in unconjugated relation, comprising subjecting said compound to contact at elevated temperature with an iodine compound which is capable of reacting with hydrogen and which serves as a catalyst, whereby to effect an increase in the refractive index of said polyene compound, thereafter adding to said polyene compound and catalyst an oil soluble silver compound, whereby to form an iodine substance insoluble in said polyene compound, and removing said iodine substance from said polyene compound.

11. In a process for the removal of iodine from a composition containing iodine and a fatty polyene compound, the steps of adding to said composition an oil soluble lead compound, whereby to form an iodine substance insoluble in said composition, and removing said iodine substance from said composition.

12. In a process for the removal of iodine from a composition containing iodine and a fatty polyene compound, the steps of adding to said composition an oil soluble silver compound, whereby to form an iodine substance insoluble in said composition, and removing said iodine substance from said composition.

13. A process for treating a fatty polyene compound containing double bonds in unconjugated relation, comprising subjecting said compound to contact at elevated temperature with an iodine compound which is capable of reacting with hydrogen and which serves as a catalyst, whereby to effect an increase in the refractive index of said polyene compound, adding to said polyene compound an oil soluble lead compound, heating the mixture while agitating the same to promote the reaction producing an iodine substance insoluble in said polyene compound, and removing said iodine substance from said polyene compound.

14. A process for treating a fatty polyene compound containing double bonds in unconjugated relation, comprising subjecting said compound to contact at elevated temperature with an iodine compound which is capable of reacting with hydrogen and which serves as a catalyst, whereby to effect an increase in the refractive index of said polyene compound, adding to said polyene compound an oil soluble silver compound, heating the mixture while agitating the same to promote the reaction producing an iodine substance insoluble in said polyene compound, and removing said iodine substance from said polyene compound.

15. A process for treating a fatty polyene compound containing double bonds in unconjugated relation, comprising subjecting said compound to contact at elevated temperature with an iodine compound which is capable of reacting with hydrogen and which serves as a catalyst, whereby to effect an increase in the refractive index of said polyene compound, thereafter adding to said polyene compound and catalyst an oil soluble copper compound, whereby to form an iodine substance insoluble in said polyene compound, and removing said iodine substance from said iodine compound.

16. A process for treating a fatty polyene compound containing double bonds in unconjugated relation, comprising subjecting said compound to contact at elevated temperature with an iodine compound which is capable of reacting with hydrogen and which serves as a catalyst, to thereby effect an increase in the refractive index of said compound, and before there is substantial increase in viscosity of the fatty compound removing the element iodine therefrom.

17. A process for treating a fatty polyene compound containing double bonds in unconjugated relation, comprising subjecting said compound to contact at elevated temperature with an iodine compound which is capable of reacting with hydrogen and which serves as a catalyst, to thereby effect an increase in the refractive index of said polyene compound, and after the rate of increase of the refractive index drops to about 0.002 for a ten minute period removing the element iodine from the polyene compound.

ANDERSON W. RALSTON.
OTTO TURINSKY.
LEON VAN AKKEREN.

REFERENCES CITED

The following references are of record in the file of this patent:

UNITED STATES PATENTS

| Number | Name | Date |
| --- | --- | --- |
| 1,837,777 | Jones | Dec. 22, 1931 |
| 1,896,467 | Scheiber | Feb. 7, 1933 |
| 1,921,564 | Cottrell | Aug. 8, 1933 |
| 1,963,065 | Auer | June 19, 1934 |
| 2,007,958 | Auer | July 16, 1935 |
| 2,189,772 | Auer | Feb. 13, 1940 |
| 2,213,944 | Auer | Sept. 10, 1940 |
| 2,244,666 | Auer | June 10, 1941 |
| 2,300,275 | Dinsley | Oct. 27, 1942 |